UNITED STATES PATENT OFFICE.

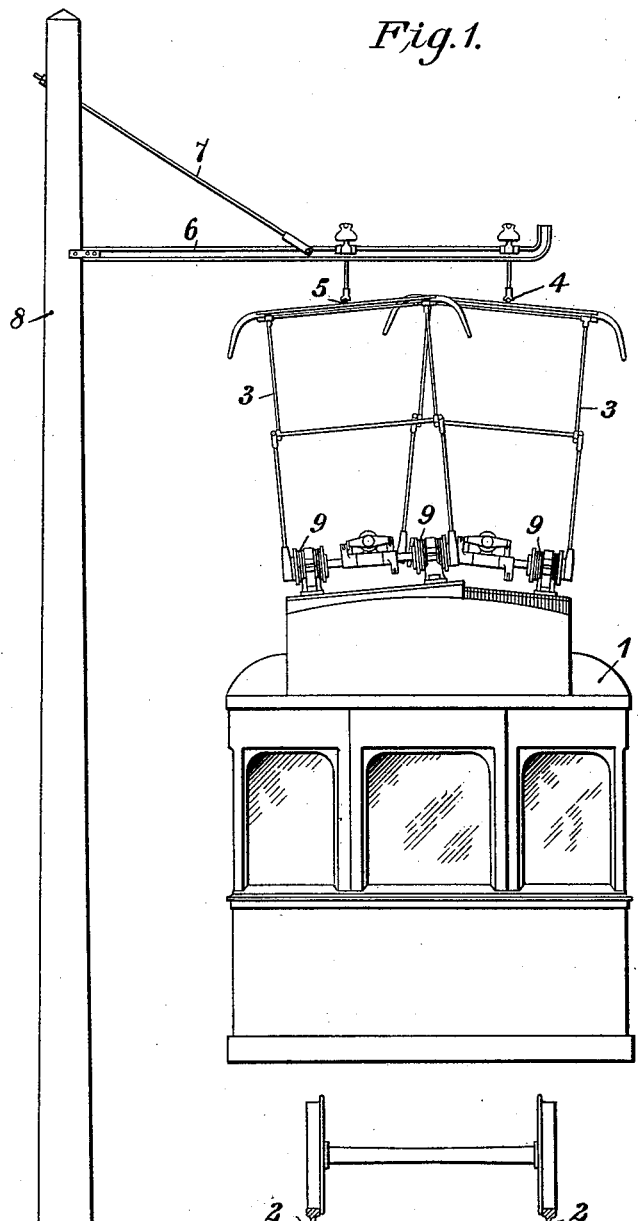

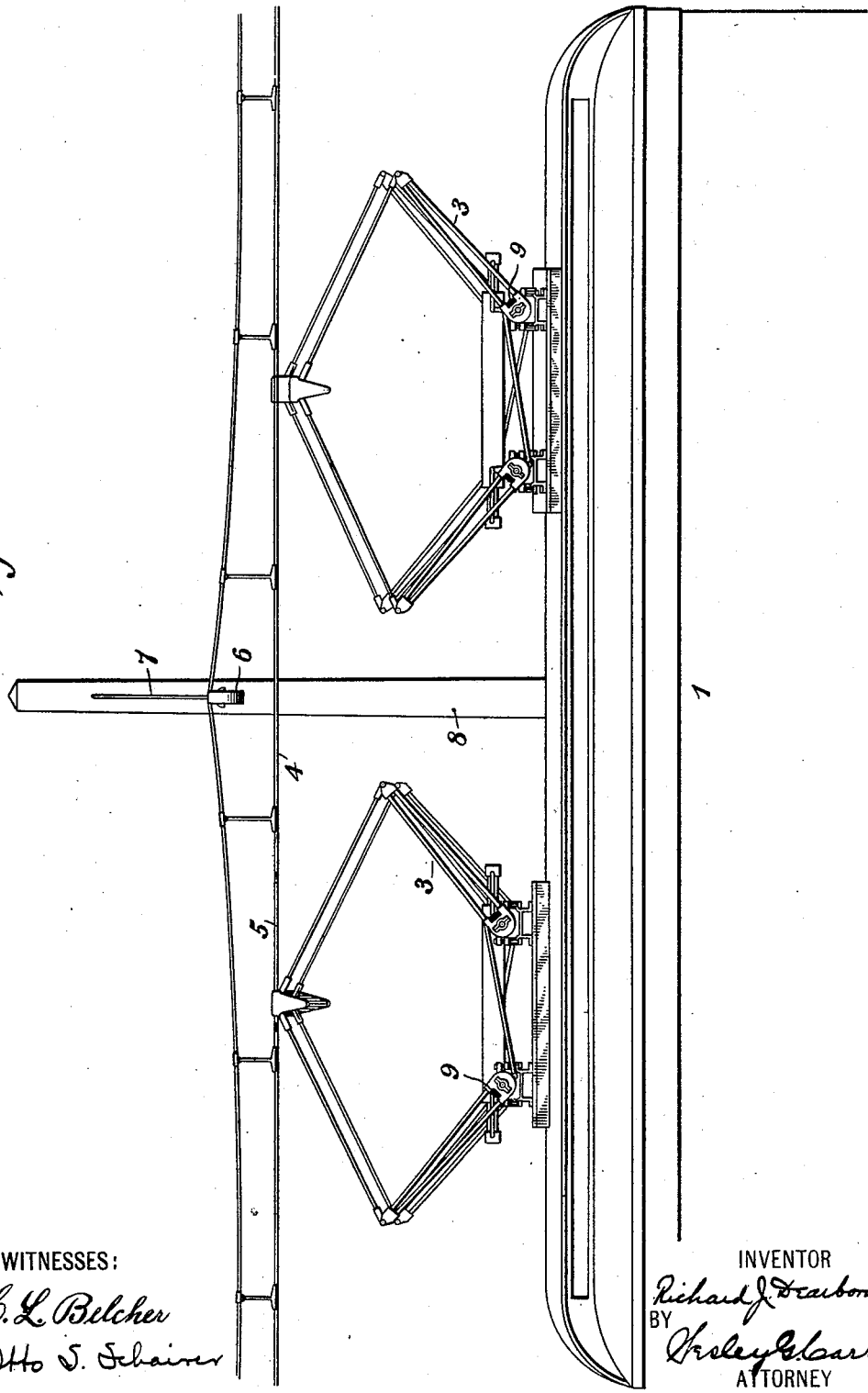

RICHARD J. DEARBORN, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRIC RAILWAY.

999,754.  Specification of Letters Patent.  Patented Aug. 8, 1911.

Application filed July 6, 1908.  Serial No. 442,219.

*To all whom it may concern:*

Be it known that I, RICHARD J. DEARBORN, a citizen of the United States, and a resident of Edgewood Park, in the county of Allegheny and State of Pennsylvania, have invented a new and useful Improvement in Electric Railways, of which the following is a specification.

My invention relates to electric railways and it has special reference to electrically operated vehicles which receive their energy from overhead line conductors.

The object of my invention is to provide an improved arrangement of trolleys whereby energy may be transmitted from a plurality of overhead line conductors carrying polyphase energy to the vehicle motors and other translating devices with which a vehicle is equipped.

One of the difficulties to be encountered in the use of polyphase alternating current motors on electric vehicles is the complexity and expense of the multi-wire overhead trolley line and the unreliability of the current collecting trolleys usually employed in this connection, where two or more overhead conductors have been utilized in the prior art they were usually disposed one above another in a vertical plane and were engaged by parts of the same trolley structure, thereby necessitating a very accurate line construction and a specially insulated trolley structure. In fact, the voltages which can be safely permitted with such a line and such a trolley structure are obviously limited and consequently one of the principal advantages of the alternating current system is lost.

According to my present invention, I employ, in general, a plurality of trolleys having a pantograph or lazy tongs structure which are materially separated from each other on the roof of the vehicle and which act in oblique planes so that they may simultaneously engage overhead line conductors which are spaced a material distance apart and which lie in substantially the same horizontal planes.

Figure 1 of the accompanying drawings is an end elevation of an electric railway line and a vehicle constructed and equipped in accordance with my invention. Fig. 2 is a side elevation showing a portion of the overhead line construction and the side elevation of the trolleys shown in Fig. 1.

Referring to the drawings, a car or vehicle 1 is adapted to operate on track rails 2 and is provided with a pair of similar trolleys 3 having a pantograph or lazy tongs structure. These trolleys operate in oblique planes and are adapted to engage overhead line conductors 4 and 5 that are suspended, by a well known catenary arrangement, from bracket arms 6 which are supported by braces 7 from poles 8 located beside the track, in the usual manner.

As shown in Fig. 2, the trolleys are materially separated on the roof of the vehicle and they are insulated from the vehicle and from each other by insulators 9.

The trolleys are preferably constructed in accordance with Patent No. 879,267, granted to Westinghouse Electric & Manufacturing Company on February 18, 1908, as assignee of Ray P. Jackson.

The advantages in the arrangement illustrated are apparent since the overhead line conductors are readily insulated from each other, are located in the same horizontal plane and are materially separated; and, by reason of the fact that a considerable lateral movement of the vehicle body is permitted without tending to separate the trolley contact shoe from the conductor or causing any conflict between the members which should be separated.

I claim as my invention:

In an electric railway, the combination with a pair of substantially parallel overhead supply circuit conductors insulated from each other and disposed in the same horizontal plane, of a vehicle having a pair of similar trolleys, each comprising a pantograph or lazytongs supporting structure and a sliding bow contact shoe, spaced apart longitudinally of the vehicle roof and acting upwardly and outwardly in opposite directions to respectively engage the supply circuit conductors.

In testimony whereof, I have hereunto subscribed my name this 16th day of June, 1908.

RICHARD J. DEARBORN.

Witnesses:
 OTTO S. SCHAIRER,
 BIRNEY HINES.

Copies of this patent may be obtained for five cents each, by addressing the "Commissioner of Patents, Washington, D. C."